United States Patent [19]

Meeker

[11] 4,288,475
[45] Sep. 8, 1981

[54] METHOD AND APPARATUS FOR IMPREGNATING A FIBROUS WEB

[76] Inventor: Brian L. Meeker, 1846 Winston, Toledo, Ohio 43614

[21] Appl. No.: 87,207

[22] Filed: Oct. 22, 1979

[51] Int. Cl.³ .................... C23C 13/08; B05D 3/00; B05D 3/02
[52] U.S. Cl. .................................. 427/294; 118/50; 427/373; 427/389.8
[58] Field of Search ............ 427/294, 296, 373, 389.8; 118/50

[56] References Cited

U.S. PATENT DOCUMENTS

| | | | |
|---|---|---|---|
| 3,042,573 | 7/1962 | Roberts | 427/296 X |
| 3,084,661 | 4/1963 | Roberts | 118/50 |
| 3,234,041 | 2/1966 | Rosecrans . | |
| 3,348,989 | 10/1967 | Roberts | 427/296 X |
| 3,473,511 | 10/1969 | Metz et al. | |
| 3,480,499 | 11/1969 | Paul . | |
| 3,533,834 | 10/1970 | Marzocchi . | |
| 3,653,174 | 4/1972 | Violleau et al. | |
| 3,680,528 | 8/1972 | Sanders . | |
| 3,793,138 | 2/1974 | Rohrer . | |
| 3,857,657 | 12/1974 | Teed . | |
| 3,865,540 | 2/1975 | Loeffler . | |
| 3,871,952 | 3/1975 | Robertson . | |
| 3,889,024 | 6/1975 | Drelich et al. . | |
| 3,900,621 | 8/1975 | Muck et al. | |
| 3,906,893 | 9/1975 | Scales . | |
| 3,953,623 | 4/1976 | Das . | |
| 3,969,780 | 7/1976 | Henderson . | |
| 3,980,045 | 9/1976 | Zollner . | |
| 4,158,076 | 6/1979 | Wallstin | 427/294 |

FOREIGN PATENT DOCUMENTS

| | | | |
|---|---|---|---|
| 941346 | 11/1963 | United Kingdom | 427/296 |
| 1380312 | 1/1975 | United Kingdom . | |
| 1395757 | 5/1975 | United Kingdom . | |
| 1397378 | 6/1975 | United Kingdom . | |
| 1398787 | 6/1975 | United Kingdom . | |
| 1401451 | 7/1975 | United Kingdom . | |

Primary Examiner—Michael R. Lusignan
Attorney, Agent, or Firm—Emch, Schaffer, Schaub & Todd

[57] ABSTRACT

A method and apparatus for impregnating a fibrous web is disclosed having a conveyor for advancing the fibrous web. The fibrous web having a first surface and a second surface. An applicator is provided for applying a foamed binder to the first surface of the fibrous web and the foamed binder seals the first surface of the web. A vacuum chamber is positioned adjacent the second surface of the web. The vacuum chamber contains a narrow slot adjacent the second surface of the web for applying a vacuum to the web. The vacuum acts upon the web to reduce the thickness of the web and to draw the foamed binder material into the web to impregnate the web.

10 Claims, 5 Drawing Figures

METHOD AND APPARATUS FOR IMPREGNATING A FIBROUS WEB

BACKGROUND OF THE INVENTION

This invention relates to a method and apparatus for impregnating a web of fibrous material. In one of the more specific aspects of the invention, a foamed or air-diluted binder is supplied to the surface of the fibrous material and a source of vacuum is used to draw the binder into the fibrous material to impregnate the material.

Resinous binder materials have been applied in the past to fibrous material to join the fibrous material into a web and to increase the strength of the collected fibrous material. In the manufacture of organic and inorganic fibrous webs, the fibrous material is formed into fibers and deposited on a collection surface. As the fibers are being deposited and collected on the surface a binder material is normally applied to the fibers. The application of the binder in this manner results in a sufficient amount of the binder coming into contact with the junctures of the fibers to hold the fibers together in a fibrous web. However, the amount of binder that can be applied to the fibrous material is severely limited in this application. If too much binder material is applied to the fibers as they are being deposited the fibers will lump together and form a solid mass on the conveyor. The application of too much binder material can also result in too much binder material being applied to the collection surface. This excess binder material can clog up the collection apparatus and result in a serious maintenance problem. In addition, it is very difficult to control the uniformity of the application of the binder material when such binder material is being applied to fibers as the fibers are formed and collected. Thus, the application of binder material to fibers as they are being formed and collected will not result in the formation of a uniformly impregnated fibrous web.

Webs of fibrous material can also be formed by combining virgin and reclaimed fibers. In this process the fibers are passed through a fiber reducing and opening apparatus where the fibers are broken down and combined. The binder material is applied after the fibers have been broken down and combined. After the binder has been applied the fibers are collected in the form of a web. There is normally sufficient contact between the binder and the fibers to hold the fibers into a web when using this process. However, the amount of binder material that can be applied to the fibers in this process is limited. In addition, the uniformity of the binder on the fibers in the web is very difficult to control. Therefore, the end uses of the fibrous web formed by this process are limited by the amount and uniformity of the binder that can be applied to the fibers that form the web.

If it is desired to increase the amount of binder in a fibrous web the additional binder is usually added after the web is formed. The fibrous web, that contain enough binder material to hold the fibers into a web, is supplied with additional liquid binder. The liquid binder is worked into the fibrous web by passing the web through the nip of two opposed rolls. The rolls are positioned to push the liquid binder material into the fibrous web. However, the rolls tend to break or damage the fibers in the fibrous web. Therefore, the rolls alter the properties of the fibrous web. In addition, the rolls do not uniformly distribute the binder material in the fibrous web. The fibers comprising the web are deposited in the web in such a random fashion that the resistance to flow to the liquid binder material varies throughout the web. Therefore, the fibrous web is not uniformly impregnated by this process.

Accordingly, there is a need in the art to develop a method and apparatus for impregnating fibrous webs that can uniformly and completely impregnate the web.

SUMMARY OF THE INVENTION

According to the invention, there is provided a method for impregnating a web of fibrous material. The web of fibrous material has a first and second surface and is advanced along a path. A foamed binder material is applied to the first surface of the web and the foamed binder material seals the first surface of the web. A source of vacuum is applied to the second surface of the web to compress the web to an extent where the resistance to flow of a fluid through the web is substantially uniform. The source of vacuum also draws the foamed binder into the web to impregnate the web with the foamed binder material.

There is also provided, according to the invention, apparatus for impregnating a fibrous web. A conveyor is provided for advancing a fibrous web having a first and a second surface. An applicator is provided for applying a foamed binder to the first surface of the fibrous web and the binder seals the first surface of the web. A vacuum chamber is positioned adjacent the second surface of the web. The vacuum chamber contains a narrow slot adjacent the second surface of the web for applying a vacuum to the web. The vaccuum acts upon the web to reduce the thickness of the web and to draw the foamed binder into the web to impregnate the web.

It is an object of the invention to provide an improved method and apparatus for impregnating a fibrous web.

It is an additional object of the invention to provide an improved method and apparatus for uniformly impregnating a fibrous web.

Other objects and advantages of the invention will become apparent as the invention is described hereinafter in more detail with reference to the accompanying drawings.

DESCRIPTION OF THE DRAWINGS

FIG. 5 is a partial side elevation view of the fibrous material being impregnated.

DESCRIPTION OF THE PREFERRED EMBODIMENT

This invention relates to a method and apparatus for impregnating a fibrous material with a foamed binder material. The invention is particularily useful in impregnating webs or batts of fibrous glass. However, the invention can also be used for impregnating webs or batts composed of other mineral, organic or inorganic fibers. The features of this invention will be more fully understood by referring to the attached drawings in connection with the following description.

Figure 1:
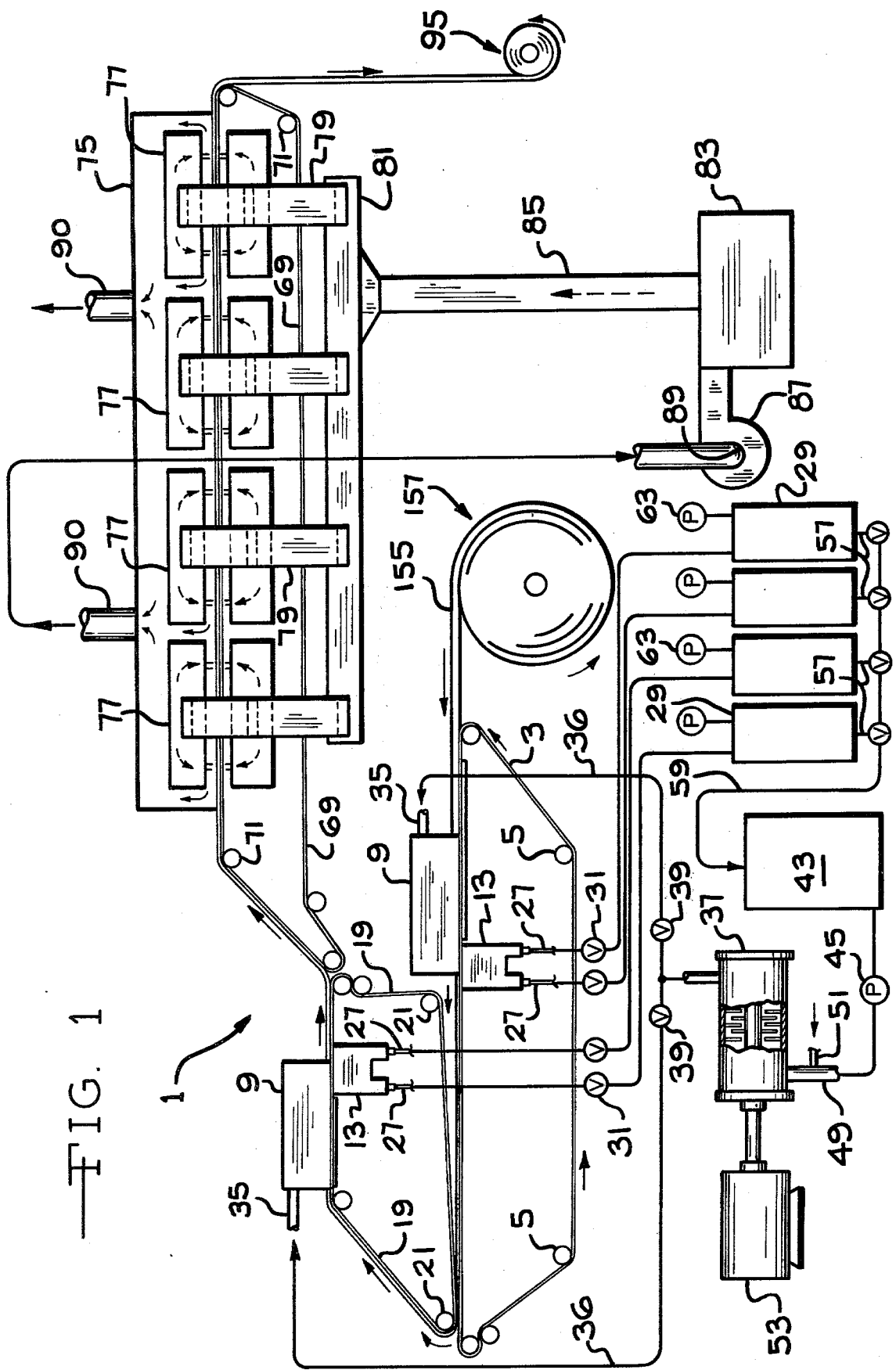
FIG. 1 is a side elevation view of the method and apparatus for impregnating a fibrous web in accordance with the present invention.

FIG. 1 shows an embodiment of an impregnator 1 of this invention. The impregnator contains a first porous of foraminous conveyor 3 for conveying the fibrous material that is to be impregnated. The conveyor can be constructed of a woven or mesh type belt provided the belt is porous. The conveyor is supported and advanced by rollers 5 in a manner well known in the art. Positioned adjacent to one side of the first conveyor 3 is a foam applicator 9. The foam applicator 9 is positioned adjacent the side of the first conveyor upon which the material to be impregnated is positioned. The foam applicator 9 is positioned with respect to the conveyor so that the material to be impregnated can pass beneath the foam applicator as it is advanced by the first conveyor 3. Positioned on the opposite side of the first conveyor 3 from the foam applicator 9 is a vacuum chamber 13. The vacuum chamber 13 is positioned adjacent to the side of the first conveyor 3 that is opposite to the side of the conveyor that is used to convey the material to be impregnated. The vacuum chamber is positioned with respect to the first conveyor 3 so that the vacuum chamber is substantially opposite to the foam applicator 9.

At the discharge end of the first conveyor 3 there is positioned a second porous of foraminous conveyor 19. The second conveyor 19 is supported and driven by rollers 21 in a manner which is well known in the art. The second conveyor 19 is positioned with respect to the first conveyor 3 so that the material to be impregnated advances onto the second conveyor. As the material advances onto the second conveyor the surface of the material that was spaced apart from the first conveyor 3 will be positioned on the surface of the second conveyor 19. The surface of the material that was in contact with the surface of the first conveyor 3 will now be spaced apart from the surface of the second conveyor 19. In other words, the fibrous material is reversed with respect to the surface of the conveyor as the fibrous material advances onto the second conveyor 19.

The foam applicator 9 is positioned adjacent the surface of the second conveyor 19 upon which the material to be impregnated is positioned. The foam applicator 9 is positioned with respect to the second conveyor 19 in substantially the same manner the foam applicator 9 was positioned with respect to the first conveyor 3. Positioned on the opposite side of the second conveyor 19 from the foam applicator 9 is a vacuum chamber 13. The vacuum chamber 13 is positioned in substantially the same manner as the vacuum chamber 13 was positioned with respect to the first conveyor 3.

The foam applicators 9, associated with the first and second conveyors, contain an inlet pipe 35 that is connected to a foaming head 37 by a conduit 36. The foaming head foams the binder and supplies the foamed binder to the foam applicators 9. Valves 39 can be positioned between the foam applicators 9 and the foaming head 37 for controlling the supply of foamed binder to the foam applicators. The binder for the foaming head 37 is supplied from a mix tank 43. A pump 45 is used to supply the binder from the mix tank 43 to the foaming head 37. The binder material enters the foaming head through an inlet pipe 49. The inlet pipe 49 also contains an air inlet 51 through which air can be supplied to the binder that is being pumped to the foaming head 37. A motor 43 is provided for operating the foaming head 37.

Almost any binder material that can be foamed or airdiluted can be used with the foam applicator 9. Usually aqueous based resinous binders such as acrylics, phenolics, vinyls, urea and polyethelene are used to impregnate the fibrous material. However, it should be noted that other thermoplastic and thermoset binders having either an aqueous or solvent base can be used to impregnate the fibrous web if the binders are capable of being foamed. It is also possible to mix various binders together and apply the combined or mixed binders to the fibrous web. The binders can be mixed to obtain the desired properties for the binder system that is to be applied to the fibrous web. It is also possible to mix fillers in with the binder material. The fillers can be used to reduce the amount of binder required, to add weight to the impregnated fibrous web or to achieve a particular property in the impregnated web.

The vacuum chambers 13, associated with the first and second conveyors, contain two vacuum chambers and each chamber is connected by a vacuum line 27 to a vacuum and storage chamber 29. A valve 31 can be positioned between the vacuum chamber 13 and the vacuum and storage chamber 29 to control the supply of vacuum to the chambers 13. The combination vacuum and storage chambers 29 contain discharge openings 56 and the discharge openings 57 are connected by conduit 59 to the mix tank 43. The combination vacuum and storage chambers 29 each have a pump 63 for discharging material from the chamber 29 through the discharge opening 57.

Positioned adjacent the second conveyor 19 is a third porous of foraminous conveyor 69. The third conveyor 69 is supported upon and is driven by rollers 71 in a manner that is well known in the art. The third conveyor 69 passes through a drying oven 75. The drying oven contains drying chambers 77 that are positioned on each side of the third conveyor 69. The drying chambers 77 are connected to a supply conduit 79 and the supply conduits are connected to a header 81. The header 81 is connected to a furnace 83 by a distribution duct 85. The furnace 83 can contain a blower 87 having an inlet opening 89. The drying oven 75 contains exhaust openings 90 through which the exhaust from the drying oven is discharged. The exhaust openings 90 can be connected to the inlet opening 89 for the blower 87.

Positioned at the end of the third conveyor 69 is a collection station 95 for collecting the fibrous material that has been impregnated on the impregnator 1. The collection station 95 can comprise a collet or spindle upon which the fibrous material may be wound into a package.

Figure 2:
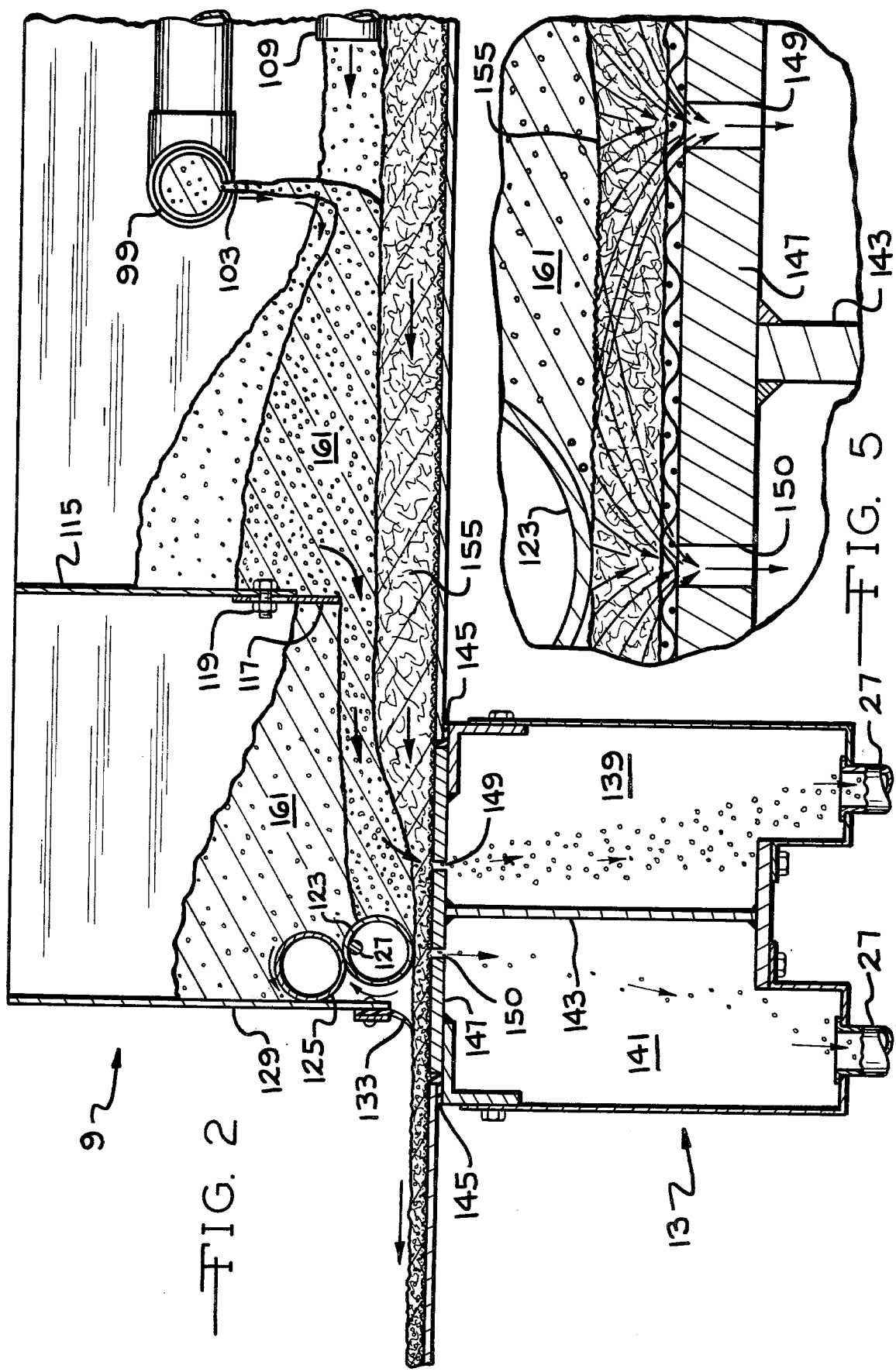
FIG. 2 is a partial side cross-sectional view of the invention.
Figure 3:
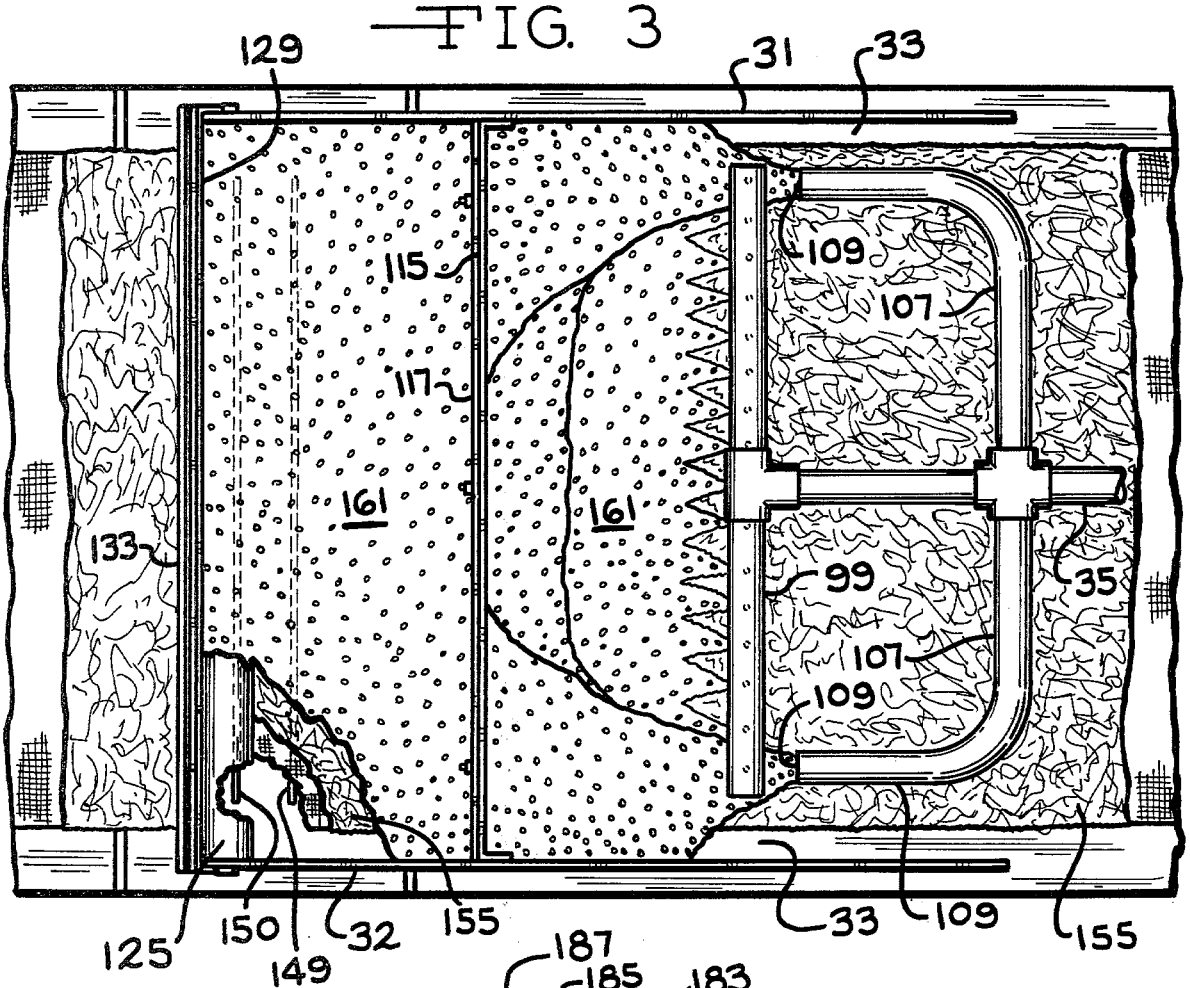
FIG. 3 is a partial plan view of the invention.

The details of the foam applicators 9 and vacuum chambers 13 will be more fully understood by referring to FIGS. 2 and 3. The foam applicator has two side walls that are substantially parallel to the direction of travel or advancement of the conveyor, two end walls that are substantially perpendicular to the direction of advancement of the conveyor and a top wall that is substantially parallel to the surface of the conveyor upon which the material to be impregnated is positioned. However, the bottom area of the foam applicator, i.e., the portion of the foam applicator that is positioned adjacent to the surface of the conveyor, is open. Thus, the foam applicator 9 defines a chamber that is open on one side and the open side of the chamber is adjacent the conveyor and the fibrous material to be impregnated. The end walls of the foam applicators are positioned so that they terminate above the surface of the conveyor. Sufficient space is provided between the surface of the conveyor and the end walls of the foam applicator to allow the fibrous material to advance on the conveyor beneath the foam applicator. The sidewalls 32 of the foam applicator extend down to the surface of the conveyor, also, as shown in FIG. 3, the sidewalls 32 are spaced apart from the edges of the fibrous material. A space 33 is defined between the sidewalls 32 and the edge of the fibrous material.

The foam inlet pipe 35 extends into the foam applicator and terminates in a header 99. The header 99 is disposed substantially perpendicular to the direction of advancement of the conveyor and the header 99 extends substantially across the width of the conveyor. The header 99 contains a plurality of orifices 103. The orifices 103 are substantially equally spaced along the header and extend substantially along the entire length of the header. The orifices 103 are positioned in the portion of the header 99 that is closest to the surface of the conveyor and the material to be impregnated. The direction of discharge from the orifices 103 is towards the surfaces of the conveyor and substantially perpendicular to the direction of advancement of the conveyor. The foam discharge header 99 and the orifice 103 are disposed in the foam applicator 9 so that they are in spaced apart relationship with the conveyor and the material to be impregnated.

The foam inlet pipe 35 is also connected to conduits 107. Conduits 107 terminate in discharge nozzles 109. The discharge nozzles 109 are oriented to discharge material in a direction that is substantially parallel to the direction of advancement of the conveyor. The discharge nozzles 109 are disposed approximately at the ends of the discharge header 99. There is a discharge nozzle 109 at each end of the header 99. The discharge nozzles 109 are also positioned in close proximity to the edges of the conveyor. The discharge nozzles 109 are positioned between the header 99 and the surface of the material to be impregnated. In fact, the discharge nozzles 109 are disposed in close proximate relationship to the surface of the material to be impregnated. As shown in FIG. 2 the discharge nozzles 109 can be positioned to discharge material onto the advancing fibrous material before the orifices 103 in the header 99 discharges material onto the advancing fibrous material.

Positioned downstream from the header 99 and discharge nozzles 109 is a foam spreader 115. The foam spreader is disposed substantially perpendicular to the direction of the advancement of the conveyor and the spreader extends from sidewall to sidewall of the foam applicator 9. The foam spreader 115 normally terminates so that it is in spaced apart relationship with the conveyor and the fibrous material to be impregnated. The portion of the foam spreader 115 that is in closest proximity to the conveyor and fibrous material contains an adjustable blade 117. The adjustable blade 117 is adjustably secured to the spreader 115 by the securement means 119. The securement means 119 adjustably secures the blade 117 so that the blade can be adjusted in a direction which is substantially perpendicular to the direction of the advancement of the conveyor. Movement of the blade 117 adjusts the distance between the surface of the conveyor and the blade 117.

Positioned downstream from the foam spreader is a first roller 123 and a second roller 125. The first roller 123 is rotatably positioned on rod 127. The rod 127 is positioned in the foam applicator 9 so that the first roller 123 will be in contact with the surface of the material that is to be impregnated as the first roller 123 rotates. The second roller 125 is rotatably positioned so that it rests upon the surface of the first roller 123 that is spaced apart from the surface of the conveyor and the end wall 129 of the foam applicator 9. The first and second rollers are positioned so that their longitudinal axes are substantially perpendicular to the direction of advancement of the conveyor. The first and second roller also extend substantially across the entire width of the conveyor. The first roller 123 is free to move on the rod 127 in a direction that is perpendicular to the surface of the conveyor. Thus, the first roller is free to remove with respect to the surface of the conveyor. As the second roller 125 is positioned on the first roller, the second roller will move with any movement of the first roller.

The end wall 129 of the foam applicator 9 terminates at a position that is spaced apart from the fibrous material that is being advanced on the conveyor. A squeegy 133 is positioned on the end wall 129 and extends down to the upper surface of the fibrous material. The squeegy is normally constructed on a resilient or plyable material that can bend or deflect as the fibrous material advances.

Positioned on the opposite side of the conveyor from the foam applicator 9 is a vacuum chamber 13. The vacuum chamber 13 contains a first chamber 139 and a second chamber 141. The first and second chambers are separated by a wall 143. Thus, there are two separate chambers within the vacuum chamber 13. The vacuum chamber 13 is connected to plate 147 and plate 147 is positioned immediately adjacent the conveyor. The plate 147 and vacuum chamber 13 extend substantially across the width of the conveyor. On each side of the plate 147 the conveyor is supported by members 144. The members 144 extend substantially across the width of the conveyor. A seal 145 is positioned between the plate 147 and the members 144. The seals are positioned to prevent the flow of air between the plate 147 and the members 144. Located in the plate 147 are slot 149 and slot 150. The slots pass through the plate 147 and place the interior of vacuum chamber 13 in communication with the underside of the conveyor. Slot 149 is positioned so that it is in communication with the first chamber 139 and slot 150 is in communication with the second chamber 143 in the vacuum chamber 13. The slots 149 and 150 extend substantially across the width of the conveyor and the longitudinal axes of the slots are substantially parallel and substantially perpendicular to the direction of advancement of the conveyor. The slots are usually relatively narrow, having a width of about 0.02 to about 0.125 of an inch. However, it has been found in practice that slots having a width of about 0.040 to about 0.050 of an inch will normally work satisfactorily in impregnating fibrous material. The slots are positioned in the plate so that there is a space of about 0.25 of an inch to about 2 inches between the slots. The vacuum chamber 13 and plate 147 are disposed with respect to the conveyor so that the slots are positioned on the opposite side of the conveyor from the foam applicator 9. The slot 150 is positioned substantially beneath the first roller 123 in the foam applicator 9. A vacuum line 27 extends from the first chamber 139 and the second chamber 141 for connecting these chambers to a source of vacuum.

The operation of the impregnator will be more fully understood by referring to FIGS. 1, 2 and 3. Fibrous material 155 is advanced from a distribution station 157 onto the first porous or foraminous conveyor 3. The fibrous material can be an organic or inorganic material. In addition, the fibrous material can contain some binder material to hold the fibrous material in the form of a web. The advancement of the conveyor 3 acts to advance the fibrous material so that it moves along the advancing conveyor. The fibrous material passes under the foam applicator 9. The foam applicator is positioned in spaced apart relationship with one side of the conveyor 3 so that the fibrous material is free to pass beneath the foam applicator.

In the foam applicator 9 a foam binder material 161 is applied to the surface of the fibrous material. The resinous material is foamed or air diluted in the foaming head 37 prior to being applied to the fibrous materials. During the foaming process air bubbles are entrained into the binder to cause the binder to foam. The foaming process, therefore, produces a binder having a cellular structure with the bubbles forming the cells in the binder. The foamed binder material is applied to the fibrous material through the orifices 103 in the header 99 and the discharge nozzle 109 located on the ends of conduits 107. A sufficient quantity of foam binder material supplied to the surface of the fibrous material to insure that the entire surface of this fibrous material is coated. The discharge nozzles 109 are positioned substantially along the sides of the conveyor and the material to be inpregnated. Accordingly, more foamed binder is applied along the edges of the fibrous material as the material advance through the foam applicator 9. A portion of the binder material will be deposited in the space 33 between the sidewalls 32 of the foam applicator and the edges of the fibrous material. The foamed binder deposited in the space 33 will act to seal the edges of the fibrous material. FIGS. 2 and 3 show how additional foamed binder is applied at the edges of the fibrous material by the nozzles 109.

In most applications more foamed binder material is applied to the fibrous material than is actually required to impregnate the fibrous material. Accordingly, a foam spreader 115 is positioned in the foam applicator 9 and the foam spreader has an adjustable blade 117 positioned in adjacent spaced apart relationship to the surface of the fibrous material. The foam spreader 115 acts to distribute the foam across the entire width of the fibrous material so that there will be an adequate distribution of foamed binder on the entire surface of the fibrous material. The adjustable blade 117 is positioned to allow a measured amount of foamed binder material to pass under the foam spreader and to advance with the fibrous material. Thus, the foam spreader and adjustable blade act to apply a measured amount of foamed binder material to the surface of the fibrous material.

As the fibrous material advances along the conveyor 3 the fibrous material comes under the influence of the vacuum chamber 13. The slot 149 in plate 147 communicates with first chamber 139 in the vacuum chamber 13. The first chamber 139 is connected to a source of vacuum through vacuum line 27. Accordingly, a zone of reduced pressure is created along the slot 149 which communicates with the first chamber 139. The conveyor 3 advancing above the slots 149 is porous so that the affect of the reduced pressure, created by the slot 149, passes through the porous conveyor. The reduced pressure acts upon the fibrous material and causes it to compress or be drawn towards the slot 149 as the fibrous material advances over the slot 149. The fibrous material is compressed by the reduced pressure because the foamed binder material on the surface of the fibrous material seals the upper surface and edges of the fibrous material. As the fibrous material is sealed by the binder, the reduced pressure acts upon the fibrous material and draws it towards the slot 149. Accordingly, the reduced pressure in the first chamber 139 compresses the fibrous material. In practice, it has been found that the fibrous material will be reduced to about $\frac{3}{4}$ to about 1/10 of its original thickness as it passes over the slot 149 that communicates with the first chamber. The reduction in thickness of the fibrous material is primarily a function of the thickness of the material, the density of the material and the strength of the reduced pressure. However, it should be noted that if a very thin material is being impregnated that there may be very little compression of the fibrous material as it advances past the slot 149.

The zone of reduced pressure created by slot 149 also causes the foamed binder material 161 to be drawn into the fibrous material to impregnate the fibrous material. In fact, a portion of the foamed binder material 161 can be drawn through the fibrous material, through the porous conveyor, through the slot 149 and into the first chamber 139. After passing the slot 149 which is in communication with the first chamber 139 the fibrous material is substantially impregnated with the foamed binder material 161.

When the fibrous material is compressed or reduced in thickness, the fibrous material becomes more uniform with respect to the resistance of flow of a fluid through the fibrous material. Accordingly, the foamed binder material will be drawn through a more uniform fibrous material and the impregnation of the fibrous material will be more uniform as a result of the compression of the fibrous material. In practice, it has been found that most fibrous materials will have to be compressed to at least $\frac{1}{2}$ of their original thickness to significantly improve the resistance to flow of a fluid through the fibrous material. The degree of compression of the fibrous material can be controlled by controlling the strength of the vacuum or reduced pressure in the vacuum chamber 13. The vacuum can be controlled by adjusting the valve 31 between the vacuum chamber 13 and the vacuum and storage chamber 29. By controlling the level of vacuum in vacuum chamber 13 to be compatable with the fibrous material and foamed binder being used, the impregnation of the fibrous material can be optimized.

The fibrous material then passes over a second zone of reduced pressure which is created by slot 150 which is in communication with the second chamber 141 of the vacuum chamber 13. The second zone of reduced pressure acts to hold the fibrous material in its state of reduced thickness and draws additional foamed binder material to the interior of the fibrous material. The zone of reduce pressure created by slot 150 can also act to compress the fibrous material as the fibrous material advances past the slot. However, any such additional compression will usually be very slight. In fact, portions of the foamed binder material may pass through the fibrous material, through the porous conveyor, through the slot 150 and into the interior of the second chamber 141. As the fibrous material advances past the slot 150 the fibrous material is usually completely impregnated with the foamed binder.

The slot 150 and zone of reduced pressure created by the slot, may not be necessary to draw additional foamed binder material into the fibrous material. The fibrous material may be completely impregnated after advancing over the zone of reduced pressure created by slot 149. However, the slot 150 is available to supply an additional zone of reduced pressure if such an additional zone is required to complete the impregnation of the fibrous material. However, the zone of reduced pressure created by slot 150 does provide an additional important function in that it helps to maintain the fibrous material in contact with the conveyor. When the fibrous material is held against the conveyor, a seal between the fibrous material and conveyor is created. The seal acts to prevent air from being drawn into the slots 149 and 150 from the environment around the foam applicator 9 and vacuum chamber 13. In addition, the seals between the vacuum chamber 13 and the members supporting the conveyor also act to prevent air from the environment around the foam applicator and vacuum chamber from being drawn into the slots 149 and 150. When air is not drawn between the fibrous material and conveyor, the zone of reduced pressure from slot 149 is more effective in compressing the fibrous material and in drawing foamed binder into the fibrous material. Thus, the slot 150 will normally be connected to a source of reduced pressure to help hold the fibrous material against the conveyor even if the slot 150 is not required to further impregnate the fibrous material with the foamed binder. The valve 31 can be used to adjust the strength of the reduced pressure connected to slot 150 depending on whether the reduced pressure is being used to further impregnate the fibrous material or to hold the fibrous material against the surface of the conveyor.

When the fibrous material passes over slots 149 and 150 the zone of reduced pressure from the slots diverges, as shown in FIG. 5, as it acts upon the fibrous material. The effect of the zone of reduced pressure fans out from the slot and acts upon a wider area of the fibrous material. In constructing the vacuum chamber 13 it is important that the slots 149 and 150 be positioned so that the diverging effect of the reduced pressure from the slots will overlap in the fibrous material. By having the effect of the zones of reduced pressure from slots 149 and 150 overlap the fibrous material will continually be under the influence of the reduced pressure as the fibrous material passes over the slots 149 and 150. Accordingly, the fibrous material will be held against the conveyor by the overlapping effect of the reduced pressure, a good seal will exist between the fibrous material and the conveyor and the reduced pressure from slots 149 and 150 will be more effective in impregnating the fibrous material.

The zones of reduced pressure created by slots 149 and 150 must be sufficiently strong to create a pressure differential in the fibrous material that will draw the foamed binder material into the fibrous material. The widths of the slots 149 and 150 can be set so that there will be a sufficient pressure differential created by the slots. Generally, the narrower the slot, the greater the pressure differential that will be created by the slots. In addition, valves 31 can be adjusted to control the strength of the vacuum supplied to the slots 149 and 150.

Positioned above the slot 150 is the first roller 123 and the second roller 125. The first and second rollers are positioned in the foam applicator to keep excess foamed binder material from remaining on the surface of the fibrous material after the fibrous material passes the slot 150. The first roller 123 is mounted on the rod 127 so that the roller 123 is free to move in a direction perpendicular to the surface of the fibrous material. Therefore, if there is a bump or depression in the fibrous material the first roller 123 can move to stay in contact with the surface of the fibrous material. The movement of the first roller 123 keeps the roller from being damaged and keeps the roller from damaging the fibrous material if there is a lump or other problem in the fibrous materials.

As the impregnated fibrous material advances along the conveyors from the foam applicator 13 there is a squeegy 133 which is positioned on the end wall 129 of the foam applicator. The squeegy 133 is constructed of a resilient material and the end of the squeegy is in contact with the surface of the fibrous material. The squeegy is positioned at the end of the foam applicator to remove any excess foamed binder that may remain on the surface of the fibrous material after the fibrous material has passed through the foam applicator.

After passing through the foam applicator 9 and vacuum chamber 13 associated with the first conveyor 3 the impregnated fibrous material advances along the first conveyor until it comes into contact with the second conveyor 19. The impregnated fibrous material then is transferred to the second porous conveyor 19. The second conveyor 19 is positioned so that surface of the impregnated fibrous material that was spaced apart from the surface of the first conveyor 3 will be in contact with the surface of the second conveyor 19. And the surface of the impregnated fibrous material that was in contact with the surface of the first conveyor 3 will now be spaced apart from the surface of the second conveyor 19. The impregnated fibrous material advances along the second conveyor 19 until it comes in contact with a foam applicator 9 and a vacuum chamber 13 which are substantially similar in position and operation to the foam applicator 9 and the vacuum chamber 13 associated with the first conveyor 3. As the impregnated fibrous material passes between the foam applicator 9 and vacuum chamber 13 associated with the second conveyor 19, foamed binder material can again be applied to the fibrous material. The application of the foam binder material and the impregnation of the fibrous material will be substantially the same as the process described in connection with the first conveyor 3. However, the foamed binder material will be drawn into the fibrous material in the opposite direction to that shown in respect to first conveyor 3. By changing the direction of impregnation of the fibrous material the uniformity of the impregnation will be improved. The second impregnation step shown in connection with the second conveyor 19 may not be required in the impregnation of all fibrous materials. In fact, the numbers of foam applicators and vacuum chambers associated with the impregnation process can be varied to achieve the desired level of impregnation for the fibrous material and foamed binder being used.

The first chamber 139 and second chamber 141 of the vacuum chambers 13 are connected to a vacuum and storage chamber 29 by means of vacuum line 27. It should be noted that the first chamber 139 and second chamber 141 of each vacuum chamber 13 is connected to a separate vacuum and storage chamber by a separate vacuum line 27. The vacuum and storage chambers 29 supply the source of negative pressure or vacuum for the vacuum chamber 13. This source of vacuum is supplied to the vacuum chamber 13 by vacuum line 27. The chambers 29 are, however, also storage chambers. When the fibrous material is subjected to the reduced pressure or vacuum of the first chamber 139 or second chamber 141 the reduced pressure causes the foamed binder to move into the fibrous material and impregnate the fibrous material. As previously described some of the foamed binder material may pass through the fibrous material and be drawn into the first or second chambers of the vacuum chamber 13. The foamed binder is drawn through the first and second chambers and into vacuum line 27 by the reduced pressure or vacuum created in the combination vacuum and storage chambers 29. Thus, the foamed binder material that is drawn into the vacuum chamber 13 passes through vacuum line 27 and into the combination vacuum and storage chambers 29. In the chamber 29 the binder material is separated out and positioned in a storage area in the chamber. The collected binder material can then be discharged through discharge openings 57 in the chambers 29 into conduit 59 which empties into the mix tank 43. The binder material is discharged from the chambers 29 by pumps 63 which are connected to each of the individual vacuum and storage chambers. A valve can be fitted between the discharge opening 57 and the conduit 59 to control the flow of the binder from the discharge and storage chambers 29 to the mix tank 43. In this fashion the binder that passes through the fibrous material and into the vacuum chamber 13 can be collected in the chambers 29 and then recycled into the mix tank 43 for reuse in impregnating the fibrous material.

In the mix tank 43 the binder material collected in the chambers 29 is mixed with new binder material. The mixture of binder material in tank 43 is pumped through a conduit 49 by pump 45 into a foaming head 37. Air can be introduced into the conduit 49 and into the binder through air inlet 51. The air inlet connects to the conduit 49 at a point in close proximity to where the conduit enters the foaming head. In the foaming head 37 the combination of the binder material and air is foamed. A suitable motor 53 is provided for driving the foaming head 37. The foamed binder material is supplied to the foam applicator by a conduit 35. Valve 39 can be positioned between the foaming head and the foam applicators to control the flow of the foam binder to the foam applicators.

The foamed binder is particularly well suited for impregnating a web of fibrous material because of the bubbles or cells formed in the binder during foaming. The bubbles become trapped or caught in the interstice between the fibers of the fibrous material. The trapping of the bubbles allows a higher percentage of binder to be retained in the fibrous material. Using a foamed binder it has been found that up to about 50% to about 60% by weight of the impregnated fibrous material can be comprised of binder. However, in practice it has been found that is usually only necessary to apply about 10% to about 40% by weight of binder material to the fibrous material.

From the second conveyor 19, the impregnated fibrous material advances to the third conveyor 69. As the impregnated fibrous material advances along the third conveyor 69 it passes into a drying oven 75. The drying oven 75 has a plurality of drying chambers 77 positioned therein. The drying chambers are constructed so that there is a chamber on each side of the third conveyor 79. The drying chambers are connected to a supply conduit 79 and the supply conduit is connected to a header 81. The header 81 is connected to a furnace 83 by a distribution duct 85. A blower 87 is connected to the furnace 83 for forcing hot air or other heated gaseous material up the distribution duct 85 into the header 81 through the supply conduit 79 and into the drying chamber 77. The drying chambers 77 are arranged so that the heated air or gaseous material will pass through the impregnated fibrous material to dry the foam binder. In drying the foam binder the heated air or gaseous material removes the aqueous or liquid portion of the foam binder and leaves the solid binder in position within the fibrous material. Exhaust openings 90 are provided in the drying oven 75 through which exhaust gases can be removed from the drying oven. The exhaust gases removed through the exhaust openings 90 can be recirculated so that they flow back to the blower 87 which is associated with the furnace 83. In this manner the hot exhaust gases from the drying oven 75 can be recirculated through the furnace and reused to dry the impregnated fibrous material. The bubble or cell structure of the foamed binder increases the surface area of the aqueous or liquid portion of the binder. Accordingly, there is more surface area of the aqueous or liquid material that will be contacted by the heated drying fluid. The increased surface area allows the aqueous or liquid portion to be removed from the resinous material using less energy. The drying oven 75 removes the aqueous or liquid portion of the binder material and leaves the solid binder material in the fibrous web. Therefore, when the impregnated fibrous material leaves the drying oven 75 it is impregnated with a dried binder material.

As the aqueous portion of the foamed binder is being removed in the drying oven 75 the fibrous material begins to recover its original thickness. The fibrous material begins to expand because the dryer binder material does not have as much weight or adhesive force to hold the fibrous material in a compressed state. When substantially all of the aqueous material has been removed from the binder by the drying oven the fibrous material will have recovered substantially its original thickness. Therefore, the drying oven 75 restores the fibrous material to substantially its full thickness. It should be noted that the drying oven 75 only removes the aqueous or liquid material from the binder and that the binder is not being cured in the drying oven.

After the fibrous material has been impregnated, dried and collected, the fibrous material can be further processed to form finished products. The impregnated fibrous material can be cut to size, molded to change its contour and further heated to cure the binder on the fibrous material. Curing the binder will cause the binder material to become rigid and to hold the fibrous material in a desired shape or form.

Figure 4:
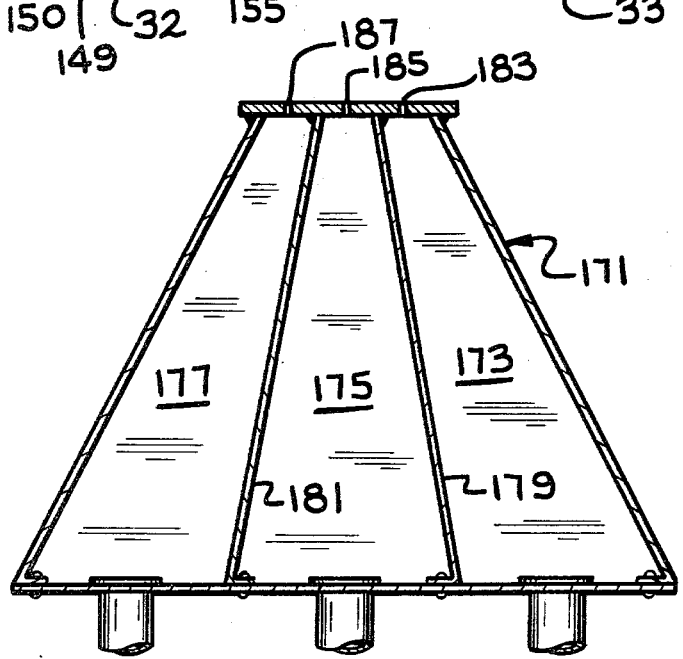
FIG. 4 is a side elevation view of an alternative embodiment of the invention.

FIG. 4 shows another embodiment for a vacuum chamber that can be used with the present invention. A vacuum chamber 171 is shown that has a first chamber 173, a second chamber 175 and a third chamber 177. The three chambers are separated by wall 179 and wall 181. The first chamber 173 contains a slot 183 in the top wall of the chamber. The second chamber 175 contains a slot 185 in the top wall of the chamber. The third chamber 177 contains a slot 187 in the top wall of the chamber. The vacuum chamber 171 is positioned in substantially the same manner and operates in substantially the same manner as the previously described vacuum chamber 13. However, in vacuum chamber 171, there is an additional chamber and slot for applying a zone of reduced pressure to a fibrous material to be impregnated.

The additional chamber and slot used in vacuum chamber 171 allows a zone of reduced pressure to be placed over a wider area of the fibrous material to be impregnated. The larger zone of reduced pressure allows more foamed binder material to be drawn into the fibrous material as the fibrous material passes over the vacuum chamber 171. Thus, more complete impregnation will occur as the fibrous material is passed over the vacuum chamber 171 or the fibrous material can be advanced at a higher rate of speed over the vacuum chamber 171 and receive the same degree of impregnation.

Although vacuum chambers have been described as having 2 and 3 chambers with each chamber containing a slot, it should be noted that the vacuum chamber can be constructed with any number of chambers and slots, however, it has been found to be advantageous to construct the vacuum chamber with at least two regions of reduced pressure that can act upon the fibrous material to be impregnated. It should also be noted, that any number of foam applicators and vacuum chambers can be utilized to impregnate the fibrous material.

Having described the invention in detail and with reference to the drawings, it will be understood that such specifications are given for the sale of explanation. Various modifications and substitutions, other than those cited, can be made without departing from the scope of the invention as defined by the following claims.

What I claim is:

1. A method for impregnating a web of fibrous material comprising the steps of:
    advancing a web of fibrous material having a first and a second surface along a path;
    applying a foamed binder material to the first surface of the web, the foamed binder material sealing the first surface of the web; and
    applying a source of vacuum to the second surface of the web, the vacuum being applied at a first and second location to the second surface of the web, the vacuum from the first and second locations overlapping in effect on the web, the vacuum compressing the web of fibrous material to an extent where the web is no more than one half its original thickness whereby the resistance to flow through the web is substantially uniform, the source of vacuum drawing the foamed binder into the web to impregnate the web with binder material.

2. The method of claim 1 in which the vacuum from the second location maintains the web in contact with the surface of the conveyor and draws additional foamed binder into the web to impregnate the web with foamed binder.

3. The method of claim 1 in which the foamed binder material is uniformly distributed on the first surface of the web of fibrous material.

4. The method of claim 1 in which the impregnated web is reversed in orientation, foamed binder material is applied to the second surface of the web and vacuum is applied to the first surface of the web to draw the foamed binder material into the web to impregnate the web.

5. Apparatus for impregnating a fibrous web comprising:
    a conveyor for advancing a fibrous web, the fibrous web having a first surface and a second surface;
    an applicator for applying a foamed binder to the first surface of the fibrous web, the foamed binder sealing the first surface of the web; and
    a vacuum chamber positioned adjacent the second surface of the web, the vacuum chamber containing at least two narrow slots adjacent the second surface of the web for applying a vacuum to the web, the vacuum from the slots overlapping in effect on the web, the vacuum acting upon the web to compress the web to an extent where the web is no more than one half its original thickness whereby the resistance to flow through the web is substantially uniform and to draw the foamed binder into the web to impregnate the web.

6. The apparatus of claim 5 wherein a header having a plurality of orifices is used to apply the foamed resinous material to the fibrous web, the header being positioned perpendicular to the direction of advancement of the web.

7. The apparatus of claim 6 wherein discharge nozzles are positioned adjacent the longitudinal edges of the conveyor for applying foamed binder material to the fibrous web, the discharge nozzles discharging binder material in a direction parallel to the direction of advancement of the web.

8. The apparatus of claim 5 wherein the applicator contains a spreader for distributing a uniform layer of foamed binder on the first surface of the fibrous web.

9. The apparatus of claim 5 wherein the vacuum chamber has a plurality of independent chambers, each chamber being connected to an individual source of vacuum, each chamber containing a narrow slot adjacent the second surface of the web.

10. Apparatus for impregnating a fibrous web comprising:
    a conveyor for advancing a fibrous web, the fibrous web having a first surface and a second surface;
    an applicator for applying a foamed binder to the first surface of the fibrous web, the applicator containing a header having a plurality of orifices positioned adjacent the first surface of the web and discharge nozzles positioned adjacent the longitudinal edges of the web, the foamed binder sealing the surface of the web; and
    a vacuum chamber positioned adjacent the second surface of the web, the vacuum chamber having a plurality of independent chambers, each chamber being connected to an individual source of vacuum, each chamber contains a narrow slot adjacent the second surface of the web for applying a vacuum to the web, the slots being positioned so that the vacuum effect of each slot on the fibrous web overlaps, the vacuum acting upon the web to compress the web to an extent where the web is at least one half its original thickness whereby the resistance to flow through the web is substantially uniform and to draw the foamed binder into the web to impregnate the web.

* * * * *